(12) United States Patent
Sugiyama et al.

(10) Patent No.: US 8,455,425 B2
(45) Date of Patent: Jun. 4, 2013

(54) PARTICLES CONTAINING ALKALI

(75) Inventors: Yoichi Sugiyama, Wakayama (JP);
Sachiko Yoshioka, Wakayama (JP);
Toshiharu Noguchi, Wakayama (JP)

(73) Assignee: Kao Corporation, Tokyo (JP)

( * ) Notice: Subject to any disclaimer, the term of this patent is extended or adjusted under 35 U.S.C. 154(b) by 111 days.

(21) Appl. No.: 12/994,097

(22) PCT Filed: Mar. 9, 2009

(86) PCT No.: PCT/JP2009/054458
§ 371 (c)(1),
(2), (4) Date: Nov. 22, 2010

(87) PCT Pub. No.: WO2009/142050
PCT Pub. Date: Nov. 26, 2009

(65) Prior Publication Data
US 2011/0086792 A1 Apr. 14, 2011

(30) Foreign Application Priority Data
May 23, 2008 (JP) .................................. 2008-135929

(51) Int. Cl.
*C11D 17/06* (2006.01)
*C11D 3/10* (2006.01)
*C11D 3/12* (2006.01)
*C11D 7/20* (2006.01)
*C11D 11/00* (2006.01)

(52) U.S. Cl.
USPC ............ 510/441; 510/349; 510/507; 510/509

(58) Field of Classification Search
USPC .................................. 510/441, 349, 507, 509
See application file for complete search history.

(56) References Cited

U.S. PATENT DOCUMENTS

| 3,953,379 A | * | 4/1976 | Cala | ............................... 510/352 |
| 4,062,647 A | | 12/1977 | Storm et al. | |
| 4,581,042 A | * | 4/1986 | Willmore | ........................ 51/293 |

(Continued)

FOREIGN PATENT DOCUMENTS

| CN | 1678727 A | 10/2005 |
| EP | 2 003 192 A2 | 12/2008 |

(Continued)

OTHER PUBLICATIONS

Chinese Office Action with English translation dated Jan. 11, 2012, for Application No. 200980118766.7.

(Continued)

*Primary Examiner* — Lorna M Douyon
(74) *Attorney, Agent, or Firm* — Birch, Stewart, Kolasch & Birch, LLP

(57) ABSTRACT

The present invention relates to [1] alkali agent-containing particles which are free from deterioration of dissolvability in water and excellent in anti-caking property and which include (a) particles containing an alkali agent and having an average particle size of from 150 to 1000 μm, and a layer of (b) clay mineral particles exhibiting a water impregnation capacity of 200% by mass or more and having an average particle size of from 1 to 200 μm, the layer being formed on a surface of the respective particles (a); and [2] a method for suppressing caking of the alkali agent-containing particles including the step of forming a layer of the clay mineral particles (b) on a surface of the respective particles (a).

12 Claims, 3 Drawing Sheets

U.S. PATENT DOCUMENTS

| | | | | |
|---|---|---|---|---|
| 4,999,125 A | * | 3/1991 | Goodman | 510/530 |
| 5,008,029 A | * | 4/1991 | Carmello et al. | 510/196 |
| 5,318,714 A | * | 6/1994 | Markussen et al. | 510/374 |
| 5,468,516 A | | 11/1995 | Yamashita et al. | |
| 5,691,297 A | * | 11/1997 | Nassano et al. | 510/444 |
| 5,698,513 A | * | 12/1997 | Schulz et al. | 510/501 |
| 5,783,537 A | * | 7/1998 | Ahmed et al. | 510/193 |
| 6,221,826 B1 | * | 4/2001 | Surutzidis et al. | 510/349 |
| 6,596,683 B1 | * | 7/2003 | Ebihara et al. | 510/441 |
| 2005/0272629 A1 | * | 12/2005 | Hasumi et al. | 510/447 |
| 2010/0298199 A1 | * | 11/2010 | Ozeki et al. | 510/334 |

FOREIGN PATENT DOCUMENTS

| | | |
|---|---|---|
| JP | 49-85102 A | 8/1974 |
| JP | 8-283799 A | 10/1996 |
| JP | 2004-143394 A | 5/2004 |
| JP | 2008-189726 A | 8/2008 |
| WO | WO 2007/114484 A | 10/2007 |

OTHER PUBLICATIONS

International Search Report for PCT/JP2009/054458 dated Jun. 9, 2009.

Office Action issued Aug. 3, 2012, in Chinese Patent Application No. 200980118766.7, with English translation.

Extended European Search Report issued Nov. 5, 2012, in European Patent Application No. 09750412.0.

* cited by examiner

PARTICLES CONTAINING ALKALI

FIELD OF THE INVENTION

The present invention relates to alkali agent-containing particles and a method for suppressing caking of the alkali agent-containing particles.

BACKGROUND OF THE INVENTION

Particles containing an alkali agent such as detergent particles tend to suffer from caking, i.e., such a phenomenon that the particles are bonded together into a solidified state, during storage. In particular, the particles containing an alkali metal carbonate tend to react with carbon dioxide and water in air during storage to form a sesqui-carbonate on a surface thereof. In accordance with researches made by present inventors, it has been found that the thus formed sesqui-carbonate causes aggregation between the adjacent particles which results in occurrence of caking of the particles. Once the particles suffer from caking, there tends to occur such a problem that the resulting detergent not only exhibits a poor appearance but also is incapable of being accurately weighed and, therefore, considerably deteriorated in handing property upon use.

To avoid occurrence of such a caking phenomenon, it is generally known that the surface of the respective detergent particles is suitably coated to prevent the particles from contacting with outside air. However, since the particles such as a powdery detergent are also required to exhibit a promoted dissolution in water, it is very difficult for these particles to satisfy both a good stability and a good dissolvability at the same time.

Patent Document 1 discloses a detergent composition containing a smectite-type clay softening agent. Patent Document 2 discloses a process for producing a granular detergent composition by adding a swelling clay such as sodium montmorillonite to a granular substance containing a detergent active substance and a water-soluble crystalline inorganic salt and then treating the resulting mixture using a high-speed mixer/granulator. The swelling clays described in Patent Documents 1 and 2 are not coated on the surface of the respective detergent composition particles, but incorporated within the particles.

On the other hand, Patent Document 3 discloses a granular chemical agent for detergent compositions which is provided on a surface thereof with a coating containing a lipophilic smectite-type clay. Patent Documents 4 and 5 disclose detergent particles obtained by coating the surface of the respective base detergent particles with a primer agent layer and a surface-coating agent layer.

In the techniques described in Patent Documents 3 to 6 in which the clay mineral is used as a surface-modifying agent for detergent particles, occurrence of caking of the detergent particles can be inhibited only to some extent but not to a fully satisfactory extent. Therefore, there is an increasing demand for development of techniques for improving an anti-caking property of the detergent particles without deterioration of dissolvability in water.

Patent Document 1: JP 49-85102A
Patent Document 2: JP 3-210398A
Patent Document 3: JP 2-286800A
Patent Document 4: JP 2004-143394A
Patent Document 5: JP 2005-171149A
Patent Document 6: JP 2008-189726A

SUMMARY OF THE INVENTION

The present invention relates to the following aspects [1] and [2].

[1] Alkali agent-containing particles including (a) particles containing an alkali agent and having an average particle size of from 150 to 1000 μm, and a layer of (b) clay mineral particles exhibiting a water impregnation capacity of 200% by mass or more as calculated according to the following method and having an average particle size of from 1 to 200 μm, the layer being formed on a surface of the respective particles (a):

Method for calculation of water impregnation capacity:

A dispersion of the clay mineral particles (b) obtained after measuring a swelling power of the particles (b) according to a Standard Testing Method of Japan Bentonite Manufactures Association "Swelling Test Method for Bentonite (Powder)" (JBAS-104-77) (volumetric method) is subjected to suction filtration (under 0.5 MPa for 2 h; filter paper: "Type No. 4A" having a diameter of 90 mm available from Advantec Toyo Kaisha, Ltd.) using a Buchner funnel to measure a mass (A) of a residue of the clay mineral particles (b) on the filter paper; the clay mineral particles (b) are dried according to a drying method of a sample prescribed in JIS K0068 "Method for Measuring Water Content of Chemical Products; 7: Loss-on-Drying Method" to measure a mass (B) of the dried clay mineral particles (b); and a water impregnation capacity of the clay mineral particles (b) is calculated from the thus measured mass (A) and mass (B) according to the following formula:

Water impregnation capacity (%)=$[(A-B)/B]\times 100$.

[2] A method for suppressing caking of alkali agent-containing particles, including the step of forming a layer of (b) clay mineral particles exhibiting a water impregnation capacity of 200% by mass or more as calculated according to the method as defined above and having an average particle size of from 1 to 200 μm on a surface of each of (a) particles containing an alkali agent and having an average particle size of from 150 to 1000 μm.

DETAILED DESCRIPTION OF THE INVENTION

Figure 1:
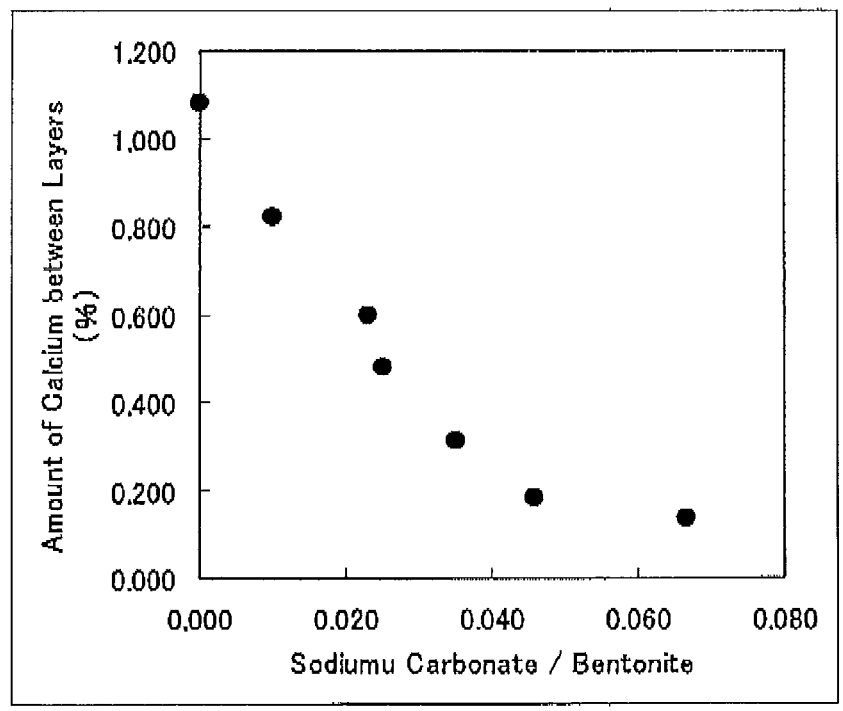
FIG. 1 is a graphic view showing a relationship between a "mass ratio of sodium carbonate/bentonite" used for activating a layered clay mineral 2 and an "amount of calcium between layers" of the layered clay mineral which is eluted with ammonium chloride.

The present invention relates to alkali agent-containing particles exhibiting an excellent anti-caking property without deterioration of dissolvability in water, and a method for suppressing caking of the alkali agent-containing particles.

In order to improve an anti-caking property of particles, it is generally required to inhibit the particles from contacting with water. For this purpose, it is commonly known that a surface-modifying agent used therefor is selected from hardly water-absorptive materials. In other words, if a water-absorptive material is used as the surface-modifying agent for the particles, the treated particles tend to be considerably deteriorated in flowability. Therefore, it is commonly known that such a water-absorptive material is not used as the surface-modifying agent for the particles.

However, the present inventors have found that specific clay mineral particles having an enhanced water absorptivity are contrarily capable of remarkably improving an anti-caking property of particles and have no significant adverse influence on flowability thereof.

Thus, the present invention relates to the following aspects [1] and [2]:

[1] Alkali agent-containing particles comprising (a) particles containing an alkali agent and having an average particle size of from 150 to 1000 μm, and a layer of (b) clay mineral particles exhibiting a water impregnation capacity of 200% by mass or more as calculated according to the following method and having an average particle size of from 1 to 200 μm, the layer being formed on a surface of the respective particles (a):

Method for calculation of water impregnation capacity;

A dispersion of the clay mineral particles (b) obtained after measuring a swelling power of the particles (b) according to a Standard Testing Method of Japan Bentonite Manufactures Association "Swelling Test Method, for Bentonite (Powder)" (JBAS-104-77) (volumetric method) is subjected to suction filtration (under 0.5 MPa for 2 h; filter paper: "Type No. 4A" having a diameter of 90 mm available from Advantec Toyo Kaisha, Ltd.) using a Buchner funnel to measure a mass (A) of a residue of the clay mineral particles (b) on the filter paper; the clay mineral particles (b) are dried according to a drying method of a sample prescribed in JIS K0068 "Method for Measuring Water Content of Chemical Products; 7: Loss-on-Drying Method" to measure a mass (B) of the dried clay mineral particles (b); and a water impregnation capacity of the clay mineral particles (b) is calculated from the thus measured mass (A) and mass (B) according to the following formula:

Water impregnation capacity (%)=$[(A-B)/B] \times 100$.

[2] A method for suppressing caking of alkali agent-containing particles, comprising the step of forming a layer of (b) clay mineral particles exhibiting a water impregnation capacity of 200% by mass or more as calculated according to the method as defined above and having an average particle size of from 1 to 200 μm on a surface of each of (a) particles containing an alkali agent and having an average particle size of from 150 to 1000 μm.

The alkali agent-containing particles of the present invention has a feature in constituting from the particles (a) containing an alkali agent and having an average particle size of from 150 to 1000 μm, and a layer of the clay mineral particles (b) having a water impregnation capacity of 200% by mass or more as calculated according to the above method and an average particle size of from 1 to 200 μm which layer is formed on the surface of the respective particles (a). In the following, the particles (a), the clay mineral particles (b) and the like are explained in sequence.

<Particles (a)>

In the present invention, the particles (a) containing an alkali agent and having an average particle size of from 150 to 1000 μm (hereinafter occasionally referred to merely as the "particles (a)") are used as base particles for the alkali agent-containing particles (hereinafter occasionally referred to merely as the "detergent particles"). The average particle size of the particles (a) is preferably from 175 to 750 μm and more preferably from 200 to 500 μm from the viewpoints of good dissolvability and flowability.

The bulk density of the particles (a) is preferably 300 g/L or more, more preferably from 400 to 900 g/L and still more preferably from 500 to 800 g/L from the viewpoints of good dissolvability and compactness.

The capacity for carrying liquid components (such as surfactants) of the particles (a) is preferably as high as possible from the viewpoint of suppressing agglomeration of the particles, and is preferably 20 mL/100 g or more, more preferably 30 mL/100 g or more, still more preferably 40 mL/100 g or more and further still more preferably 50 mL/100 g or more.

The strength of the particles (a) is preferably as high as possible from the viewpoint of suppressing disintegration of the particles during the below-mentioned mixing procedure, and is preferably 100 kg/cm$^2$ or more, more preferably 200 kg/cm$^2$ or more and still more preferably 250 kg/cm$^2$ or more.

In order to enhance the strength of the particles (a), there may be appropriately and selectively used (i) the method of increasing a blending ratio of an agent capable of improving the strength of the particles (a) such as water-soluble polymers in a slurry of the particles (a); and (ii) the method of reducing a content of water in the slurry to increase a true density of the particles (a), or raising a drying temperature to reduce the water content of the particles (a).

Meanwhile, the average particle size, bulk density, carrying capacity and particle strength of the particles (a) may be measured by the respective methods described in Examples below.

(Alkali Agent (a1))

Examples of the alkali agent (a1) include alkali metal carbonates such as sodium carbonate and potassium carbonate, sodium silicate, sodium hydroxide and potassium hydroxide. Among these alkali agents, the alkali metal carbonates tend to react with carbon dioxide and water in air during storage and thereby form a sesqui-carbonate which tends to cause caking of the particles. Therefore, from the viewpoint of fully exhibiting the effects of the present invention, the particles (a) are suitably those particles containing the alkali metal carbonate as the alkali agent, in particular, those particles containing sodium carbonate as the alkali agent.

The particles (a) may be composed of the alkali agent solely. When the particles (a) are in the form of alkali agent-containing particles (detergent particles), it is desired that the particles (a) further contain the other inorganic component (a2) as well as an organic component such as a surfactant (a3) and/or a water-soluble polymer compound (a4).

(Other Inorganic Component (a2))

Examples of the other inorganic component (a2) include water-soluble inorganic salts (a2-1), e.g., alkali metal sulfates such as sodium sulfate, alkali metal hydrogencarbonates such as sodium hydrogencarbonate, and sulfites, hydrogensulfates, hydrochlorides, phosphates and ammonium salts; and water-insoluble inorganic salts (a2-2) such as crystalline silicates and aluminosilicates.

(Surfactant (a3))

Examples of the surfactant (a3) include anionic surfactants (p), nonionic surfactants (q), amphoteric surfactants and cationic surfactants. These surfactants may be used in combination of any two or more kinds thereof.

Examples of the anionic surfactant (p) include salts of sulfuric acid esters of higher alcohols, salts of sulfuric acid esters of ethoxylated higher alcohols, alkylbenzenesulfonic acid salts, paraffinsulfonic acid salts, α-olefinsulfonic acid salts, α-sulfo-fatty acid salts, and alkyl ester salts of these compounds, as well as anionic surfactants containing a sulfuric group or a sulfonic group such as fatty acid salts. Among these anionic surfactants, preferred are straight-chain alkylbenzenesulfonic acid salts containing an alkyl group preferably having 10 to 18 carbon atoms and more preferably 12 to 14 carbon atoms, and salts of sulfuric acid esters of higher alcohols preferably having 10 to 16 carbon atoms and more preferably 12 to 14 carbon atoms.

Examples of the nonionic surfactant (q) include ethyleneoxide adducts or ethyleneoxide/propyleneoxide adducts of higher alcohols, fatty acid alkanol amides and alkyl polyglycosides. From the viewpoints of removal of sebum secretion, hard water resistance and biodegradability as well as from the viewpoint of good compatibility with the straight-chain alkylbenzenesulfonic acid salts or salts of sulfuric acid esters of higher alcohols, among these nonionic surfactants, preferred are adducts of alcohols having 10 to 16 carbon atoms with 1 to 10 mol of ethyleneoxide.

Examples of the amphoteric surfactant include alkyldimethylaminoacetic acid betaines and fatty acid aminopropyl betaines. Examples of the cationic surfactant include mono- (or di-) long chain alkyl-type quaternary ammonium salts.

The surfactant (a3) is preferably the anionic surfactant (p) and/or the nonionic surfactant (q). When the anionic surfactant (p) and the nonionic surfactant (q) are used in combination thereof, the weight ratio of the anionic surfactant (p) to the nonionic surfactant (q) [(p)/(q)] is preferably 0.2 or more, more preferably 0.4 or more, still more preferably 0.5 or more and further still more preferably 1.0 or more. The upper limit of the weight ratio (p)/(q) is preferably 4.0 or less, more preferably 2 or less and still more preferably 1.5 or less.

(Water-Soluble Polymer Compound (a4))

The water-soluble polymer compound (a4) is preferably a polymer capable of being dissolved in 100 g of water at 20° C. in an amount of preferably 1 g or more, more preferably 5 g or more and still more preferably 10 g or more. Specific examples of the water-soluble polymer compound (a4) include carboxylic acid-based polymers, carboxymethyl celluloses, soluble starches and sugars. From the viewpoints of sequestering capability, capability of dispersing solid fouling and particle fouling and anti-refouling capability, among these water-soluble polymer compounds, preferred are carboxylic acid polymers having a mass-average molecular weight of preferably from 2,000 to 100,000 and more preferably from 5,000 to 70,000, and more preferred are salts of polyacrylic acids and salts of acrylic acid-maleic acid copolymers having such a mass-average molecular weight.

Method for Producing Particles (a))

The particles (a) in the form of detergent particles may be produced by the methods as described, for example, in JP 2005-239867A, JP 2005-239865A, JP 2003-193091A, etc. In addition, as the detergent particles having a very high dissolvability in water, there may also be used those particles as described in PCT Pamphlet WO 2000/077158.

Specific examples of the method for producing the particles (a) include the following methods A1 to A3.

(1) Method A1

Method of adding preferably from 10 to 70 parts by mass and more preferably from 15 to 50 parts by mass of the alkali agent (a1), preferably from 5 to 60 parts by mass and more preferably from 7 to 50 parts by mass of the water-soluble salt (a2-1), preferably from 10 to 50 parts by mass and more preferably from 15 to 40 parts by mass of the water-insoluble inorganic salt (a2-2), and preferably from 1 to 15 parts by mass and more preferably from 3 to 10 parts by mass of the water-soluble polymer compound (a4), to from 10 to 50 parts by mass and preferably from 15 to 40 parts by mass of an aqueous paste containing preferably from 50 to 100% by mass and more preferably from 70 to 100% by mass of the surfactant (a3); kneading the resulting mixture using a mixer such as a Loedige mixer; drying the kneaded material using a dryer such as a fluidized bed dryer; and then granulating/classifying the dried product to produce particles having an average particle size of from 150 to 1000 μm, preferably from 175 to 750 μm and more preferably from 200 to 500 μm.

(2) Method A2

Method of spray-drying a slurry-like solution containing preferably from 10 to 70 parts by mass and more preferably from 15 to 50 parts by mass of the alkali agent (a1), preferably from 5 to 60 parts by mass and more preferably from 7 to 50 parts by mass of the water-soluble salt (a2-1), preferably from 10 to 50 parts by mass and more preferably from 15 to 40 parts by mass of the water-insoluble inorganic salt (a2-2), preferably from 10 to 70 parts by mass and more preferably from 20 to 60 parts by mass of the surfactant (a3), preferably from 1 to 15 parts by mass and more preferably from 3 to 10 parts by mass of the water-soluble polymer compound (a4), and preferably from 30 to 300 parts by mass and more preferably from 50 to 250 parts by mass of water to obtain particles; and then granulating/classifying the resulting particles to produce particles having an average particle size of from 150 to 1000 μm, preferably from 175 to 750 μm and more preferably from 200 to 500 μm.

(2) Method A3

Method of spray-drying a slurry-like solution containing preferably from 10 to 70 parts by mass and more preferably from 15 to 50 parts by mass of the alkali agent (a1), preferably from 5 to 60 parts by mass and more preferably from 7 to 50 parts by mass of the water-soluble salt (a2-1), preferably from 10 to 50 parts by mass and more preferably from 15 to 40 parts by mass of the water-insoluble inorganic salt (a2-2), preferably from 1 to 15 parts by mass and more preferably from 3 to 10 parts by mass of the water-soluble polymer compound (a4), and preferably from 20 to 200 parts by mass and more preferably from 40 to 150 parts by mass of water to obtain particles; impregnating the resulting particles with preferably from 10 to 50 parts by mass and more preferably from 15 to 40 parts by mass of the surfactant (a3); and then granulating/classifying the thus impregnated particles to produce particles having an average particle size of from 150 to 1000 μm, preferably from 175 to 750 μm and more preferably from 200 to 500 μm, Among these methods, from the viewpoints of good dissolvability in water and flowability, most preferred is the method A3.

The particles (a) produced by the method A3 are advantageous because they are considerably improved in dissolvability in water owing to the following structure (A) and/or structure (B).

Structure (A): Porous structure capable of releasing air bubbles having a diameter that is preferably 1/10 time or more, more preferably 1/5 time or more, still more preferably 1/4 time or more and further still more preferably 1/3 time or more of the average particle size of the particles (a) into a dispersion when the particles (a) are dispersed in water.

Structure (B): Structure containing the water-insoluble inorganic salt (a2-2), the water-soluble polymer compound (a4) and the water-soluble inorganic salt (a2-1) in which the water-soluble polymer compound (a4) and/or the water-soluble inorganic salt (a2-1) (hereinafter referred to merely as the "water-soluble polymer compound, etc.") are localized in a larger amount near a surface of the respective particles rather than inside thereof.

In the particles (a) having the structure (A), in the course of dissolving the surface-modified particles in water, a small amount of water is first penetrated into the particles to release air bubbles having a predetermined size from inside thereof, and then a large amount of water is penetrated into the particles to cause disintegration of the particles themselves (self-disintegration), so that the particles undergo not only dissolution near the surface thereof but also dissolution and disintegration from the inside thereof. Thus, the surface-modified particles can exhibit a high-speed dissolvability. The air bubble-releasing phenomenon may be confirmed by observation using a digital microscope or an optical microscope, whereby the diameter of the air bubbles (circle-equivalent diameter) can be measured.

The pore diameter of the particles (a) is preferably from 1/10 to 4/5 time and more preferably from 1/5 to 4/5 time of the particle diameter thereof.

The pore diameter may be calculated in the following manner. That is, the particle (a) is cut along its section including a maximum particle diameter using a scalpel, etc., carefully so as not to break the particle, and the cut section of the particle is observed by a scanning electron microscope to measure a circle-equivalent diameter ($\gamma$ μm) of the cut section of the cut particle as well as a circle-equivalent diameter ($\delta$ μm) of the pore inside of the particle if presence of any pore therein is confirmed, thereby determining a ratio of the pore diameter to the particle diameter ($\delta/\gamma$). Meanwhile, when a plurality of pores are confirmed, $\delta$ μm is determined as a circle-equivalent diameter of the largest pore.

On the other hand, in the particles (a) having the structure (B), the water-soluble component being present near the surface thereof is more rapidly dissolved in water, so that there occurs such a dissolving behavior in which promoted disintegration of the surface-modified particles is caused from the surface thereof, whereby the particles (a) can exhibit a high-speed dissolvability, The most preferred form of the particles (a) capable of exhibiting a high-speed dissolvability has both the structures (A) and (B).

In order to obtain the particles (a) having both the structures (A) and (B), the temperature of air blown and the temperature of air discharged upon the spray-drying procedure may be appropriately controlled. The temperature of air blown is preferably from 150 to 350° C., more preferably from 175 to 325° C. and still more preferably from 200 to 300° C., whereas the temperature of air discharged is preferably from 70 to 130° C., more preferably from 80 to 120° C. and still more preferably from 90 to 110° C.

The localization of the water-soluble polymer compound, etc., in the structure (B) may be determined by the following method.
(Determination of Localization of Water-Soluble Polymer Compound, etc.)

First, the particles (a) to be measured as well as the pulverized product of the particles (a) obtained by sufficiently pulverizing the particles (a) using an agate mortar, etc., are prepared. Then, both the particles (a) and the pulverized product thereof are measured by a combined method of Fourier transform infrared spectroscopy (FT-IR) and photoacoustic spectroscopy (PAS) (hereinafter referred to merely as "FT-IR/PAS") under the conditions in which information in the range of about 10 μm in depth from the surface of each of the particles (a) and the pulverized product thereof can be attained. When the amount of the water-soluble polymer compound, etc., of the former is larger than that of the latter, it is determined that the particles (a) thus measured have the structure in which the water-soluble polymer compound, etc., are present in a larger amount near the surface thereof than inside thereof.

The conditions in which information in the range of about 10 μm in depth from the surface of each of the particles (a) and the pulverized product thereof can be attained, include, for example, a resolving power of 8 cm$^{-1}$, a scanning speed of 0.63 cm/s, and a cumulative frequency of 128 times. Examples of an apparatus usable in the above measurement include an infrared spectrophotometer such as "FTS-60A/896 Model Infrared Spectrophotometer" available from Bio-Rad Laboratories Inc., and a PAS cell such as "300 Model Photoacoustic Detector" available from MTEC Co., Ltd. Meanwhile, details of the FT-IR/PAS are described in "Applied Spectroscopy", Vol. 47, pp. 1311-1316 (1993).

The particles (a) are provided on a surface thereof with a layer of the clay mineral particles (b) which may be further provided on a surface thereof with a layer of the below-mentioned metal oxide particles (c), if required.

<Clay Mineral Particles (b)>

The clay mineral particles (b) have a water impregnation capacity of 200% by mass or more as calculated by the following method. The water impregnation capacity of the clay mineral particles (b) is preferably 300% by mass or more, more preferably 400% by mass or more, still more preferably 500% by mass or more, and further still more preferably 600% by mass or more.

The layer of the clay mineral particles (b) having an average particle size of from 1 to 200 μm, preferably from 5 to 100 μm and more preferably from 10 to 50 μm is formed on the surface of the respective particles (a).

(Method for Calculation of Water Impregnation Capacity)

The water impregnation capacity of the particles may be measured according to a Standard Testing Method of Japan Bentonite Manufactures Association "Swelling Test Method for Bentonite (Powder)" (JBAS-104-77) and a sample drying method prescribed in JIS K0068 "Method for Measuring Water Content in Chemical Products; 7: Loss-on-Drying Method". More specifically, the water impregnation capacity is measured in the following manner, That is, about 10 divided parts of 2.0 g of a sample are intermittently charged into a 100 mL measuring cylinder with a ground stopper which is filled with 100 mL of purified water, while controlling the amount of each part of the sample previously charged so as to smoothly deposit on a bottom of the measuring cylinder without adhering to an inner wall thereof. Namely, after the previously charged part of the sample is substantially completely deposited, the next part of the sample is added to the measuring cylinder. After completing the addition of the sample, the sample in the measuring cylinder is allowed to stand for 24 h, and then an apparent volume of the deposited sample in the measuring cylinder is measured and determined as a swelling power of the sample.

Next, a whole amount of a dispersion of the clay mineral particles (b) obtained after measuring a swelling power thereof is subjected to suction filtration (under 0.5 MPa for 2 h; filter paper: "Type No. 4A" having a diameter of 90 mm available from Advantec Toyo Kaisha, Ltd.) using a Buchner funnel to measure a mass (A) of a residue of the clay mineral particles (b) on the filter paper. The residual particles on the filter paper are dried at 105° C. for 3 h to measure a mass (B) of they thus dried clay mineral particles (b). The water impregnation capacity of the clay mineral particles (b) is calculated from the thus measured mass (A) and mass (B) according to the following formula.

Water impregnation capacity (%)=[(A−B)/B]×100

Meanwhile, the purified water is preferably water according to Japanese Pharmacopoeia though not particularly limited thereto.

The swelling power of the clay mineral particles (b) (by a volumetric method) is preferably 6 mL/2 g or more, more preferably 9 mL/2 g or more and still more preferably 15 mL/2 g or more as measured according to the above JBSA-104-77 from the viewpoints of good dissolvability and anti-caking property.

Only a small amount of natural clay minerals having a water impregnation capacity in the above-specified range are present, and these clay minerals are in the form of layered clay minerals classified into smectite-type clay minerals.

The "smectite" is a group name of some kinds of clay minerals, and includes saponite, hectorite, sauconite, stevensite, montmorillonite, beidellite and nontronite. Meanwhile, the "smectite-type clay minerals" as used herein mean smectite itself, clay minerals containing a clay mineral classified into the smectite as a main component, ion-exchanged products thereof, and clay minerals having a structure represented by the below-mentioned general formula (I) or (II). The hectorite as one of the smectite-type clay minerals is capable of satisfying the above water impregnation capacity. Among the other smectite-type clay minerals, as a part of natural minerals, there are present those capable of satisfying the above requirement of the present invention. Further, some of the clay minerals called "bentonite" containing montmorillonite as a main component can also satisfy the above-specified water impregnation capacity.

Calcium/magnesium-based smectite-type clay minerals many of which are present in the form of natural minerals fail to satisfy the above-specified water impregnation capacity. However, ion-exchanged smectite-type clay minerals obtained by replacing a part or whole of calcium and/or magnesium present in the smectite-type clay minerals with an alkali metal can satisfy the above-specified water impregnation capacity and, therefore, can be suitably used in the present invention. Examples of the preferred alkali metal used in the ion-exchanged clay minerals include sodium, potassium and lithium. Among these alkali metals, more preferred is sodium.

More specifically, there are preferably used particles of the smectite-type clay minerals having a structure represented by the following general formula (I):

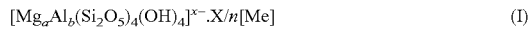

(I)

wherein a, b and X are respectively $0 < a \leq 6$, $0 \leq b \leq 4$ and $0.2 \leq X \leq 1.2$ with the proviso that $X = 12 - (2a+3b)$; Me is at least one element selected from the group consisting of Na, K, Li, Ca, Mg and $NH_4$; n is a valence of Me; and a molar ratio of $[(Na+K+Li)/(Ca+Mg+NH_4)]$ in $[Me]^{n+}$ is 0.5 or more.

The molar ratio of the alkali metal ions to a sum of the alkali earth metal ions and the ammonium ion (i.e., $[(Na+K+Li)/(Ca+Mg+NH_4)]$) in $[Me]^{n+}$ is preferably from 0.10 to 20.0, more preferably from 0.25 to 19.00, still more preferably from 0.50 to 18.00, further still more preferably from 0.75 to 17.00 and most preferably from 1.00 to 16.00.

In addition, there are more preferably used particles of the smectite-type clay minerals having a structure represented by the following general formula (II):

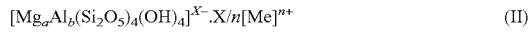

(II)

wherein a, b and X are respectively $0 < a \leq 6$; $0 \leq b \leq 4$; and $0.2 \leq X \leq 1.2$ with the proviso that $X = 12 - (2a+3b)$; Me is at least one element selected from the group consisting of Na, K, Li, Ca and Mg; n is a valence of Me; and a molar ratio of $[(Na+K+Li)/(Ca+Mg)]$ in $[Me]^{n+}$ is 0.5 or more.

The molar ratio of the alkali metal ions to the alkali earth metal ions (i.e., $[(Na+K+Li)/(Ca+Mg)]$) in $[Me]^{n+}$ is preferably from 0.10 to 20.0, more preferably from 0.25 to 19.00, still more preferably from 0.50 to 18.00, further still more preferably from 0.75 to 17.00 and most preferably from 1.00 to 16.00.

Examples of the method for producing such ion-exchanged smectite-type clay minerals include (i) the method including the steps of adding an alkali metal salt such as powdery sodium carbonate to a raw clay ore containing 20% or more of water, intimately mixing both the components with each other and then drying the resulting mixture, and (ii) the method including the step of adding a powder or an aqueous solution of an alkali metal salt such as sodium carbonate to a powdery pulverized clay mineral when granulating the clay mineral using a granulator.

In addition, in order to efficiently conduct the ion exchange, 2 to 10 parts by mass of the smectite-type clay mineral is added and dispersed in 100 parts by mass of an aqueous solution containing a specific alkali metal carbonate, preferably sodium carbonate and/or potassium carbonate, and more preferably sodium carbonate, in an amount of from 0.05 to 0.33% by mass, and the resulting dispersion is allowed to stand for 0.2 to 1 h and then dried to thereby obtain the ion-exchanged clay mineral. When controlling the concentration of sodium carbonate in the aqueous solution and controlling the ratio between the aqueous solution and the smectite-type clay mineral added thereto, the molar ratio of $[(Na+K+Li)/(Ca+Mg+NH_4)]$ or $[(Na+K+Li)/(Ca+Mg)]$ in $[Me]_{n+}$ in the general formula (I) can be adjusted to a desired value.

Meanwhile, the molar ratio of $[(Na+K+Li)/(Ca+Mg)]$ may be measured by the following method.

First, the clay mineral is pulverized in a mortar and allowed to pass through a 125 μm-mesh sieve to obtain a sample. Then, 0.1 g of the sample is decomposed with sulfuric acid/hydrogen peroxide using a microwave wet ashing apparatus (automatic) and is diluted to total 50 mL in a measuring flask. The resulting solution is measured by an ICP (inductively coupled plasma) emission spectrometer to determine amounts of Na, K, Li, Ca and Mg therein and calculate the molar ratio therebetween.

Meanwhile, the amount of Mg determined by the ICP emission spectrometric analysis includes an amount of Mg being present as a substituent for Al in a basic skeleton of montmorillonite in addition to Mg being present as the interlaminar ion (Me) in the general formula (I). Also, the amount of Ca or Mg determined by the ICP emission spectrometric analysis also includes an amount of calcium carbonate or magnesium carbonate produced upon conducting the ion exchange using the above sodium carbonate or potassium carbonate.

Therefore, the amounts of the alkali earth metals contained between layers of the clay mineral are determined as follows. That is, 1 g of the clay mineral to be measured (fine particles having a particle diameter of 150 μm or less which are obtained by pulverizing the clay mineral in a mortar) is added and dispersed in 10 mL of an ammonium chloride aqueous solution, and the resulting dispersion is allowed to stand for 12 h and then subjected to centrifugal separation to determine amounts (ppm) of the eluted alkali earth metals contained in the supernatant thus separated. The thus measured amounts are respectively subtracted from those obtained by the ICP analysis to determine the amounts of the alkali earth metals contained between layers of the clay mineral. Further, the ratio of moles of the measured alkali metals to theoretical total moles of alkali metals, alkali earth metals and $NH_4$ can also be determined.

The mass ratio of the clay mineral particles (b) to the particles (a) is preferably from 0.01 to 0.40, more preferably from 0.02 to 0.35 and still more preferably from 0.03 to 0.30, and the ratio of an average particle size of the clay mineral particles (b) to an average particle size of the particles (a) is preferably from 0.01 to 0.50, more preferably from 0.015 to 0.40 and still more preferably from 0.02 to 0.30.

(Metal Oxide Particles (c))

In the alkali agent-containing particles of the present invention, from the viewpoints of improving a flowability of the particles and finishing free-flowing clean particles, a layer of the metal oxide particles (c) exhibiting a water impregnation capacity of preferably 150% by mass or less and more preferably 100% by mass or less and having an average particle size of preferably from 0.1 to 20 μm, more preferably from 0.2 to 10 μm and still more preferably from 0.5 to 8 μm is preferably formed on an outer surface of the layer of the clay mineral particles (b), although the formation of the layer of the metal oxide particles (c) is not essential but optional.

Examples of the preferred metal oxide particles (c) include particles of silicon dioxide, silicate compounds such as crystalline silicate compounds, and bentonite, talc, clay and crystalline or non-crystalline aluminosilicates which have a water impregnation capacity of 150% by mass or less.

The crystalline silicate compounds, if used as the metal oxide particles (c), are preferably in the form of a mixture with fine particles other than the crystalline silicate compounds from the viewpoint of preventing deterioration of the crystalline silicate compounds owing to agglomeration, etc., by moisture absorption or carbon dioxide gas absorption therein. In particular, from the viewpoint of good flowability of the resulting detergent particles, among these metal oxide particles, preferred are particles of crystalline aluminosilicates, more preferred are particles of crystalline sodium aluminosilicate, and still more preferred are particles of zeolite of A-type, P-type, X-type, etc.

The mass ratio of the metal oxide particles (c) to the particles (a) is preferably from 0.05 to 0.50, more preferably from 0.10 to 0.45 and still more preferably from 0.15 to 0.40, and the ratio of an average particle size of the metal oxide particles (c) to an average particle size of the particles (a) is preferably from 0.005 to 0.100, more preferably from 0.010 to 0.075 and still more preferably from 0.015 to 0.050.

When using the zeolite as the metal oxide particles (c), primary particles of the zeolite preferably have an average particle size of 10 μm or less and more preferably from 0.1 to 10 μm. When the average particle size of the primary particles of the zeolite lies within the above-specified range, the resulting detergent particles can be enhanced in coating ratio on the surface of the respective particles, and groups of the detergent particles can be advantageously improved in flowability and anti-caking property. The average particle size of the zeolite may be measured by the method utilizing a Mie scattering, for example, using a laser diffraction/scattering particle size distribution measuring apparatus "LA-920" available from Horiba, Ltd. The mass ratio of the zeolite (c) to clay mineral particles (b) [zeolite (c)/clay mineral particles (b)] may be in the range of 10 or less, in particular, 3 or less, to allow the resulting detergent particles to exhibit good flowability and anti-caking property. When using the clay mineral particles having the water impregnation capacity as defined by the present invention, the mass ratio of the zeolite (c) to clay mineral particles (b) is preferably controlled to 1.66 or less, more preferably 1.48 or less, still more preferably 1.0 or less and further still more preferably 0.5 or less, in order to attain excellent effects.

In the present invention, a binder component (d) may also be added in order to enhance adhesion between the respective particles such as the particles (a), the clay mineral particles (b) and the metal oxide particles (c).

(Binder Component (d))

Examples of the binder component (d) include one or more materials selected from the group consisting of the nonionic surfactants exemplified as the above surfactant (a3), and polyethylene glycol, (meth)acrylic acid-based polymers and cellulose-based derivatives as the above water-soluble polymer compound (a4), as well as aqueous solutions thereof. The polyethylene glycol preferably has a mass-average molecular weight of from 4,000 to 20,000 and more preferably from 5,000 to 15,000 from the viewpoints of good solidification at the temperature (40° C. or lower) ordinarily used for detergents and good dissolvability after surface treatment. Examples of the cellulose-based derivatives include carboxymethyl cellulose, methyl cellulose and hydroxypropylmethyl cellulose.

As the binder component, there may also be used an acid precursor of anionic surfactants. The acid precursor of anionic surfactants undergoes a neutralization reaction with the alkali agent contained in the spray-dried particles. Examples of the acid precursor of anionic surfactants include alkylbenzenesulfonic acids, alkyl- or alkenyl-ethersulfuric acids, alkyl- or alkenyl-sulfuric acids, α-olefinsulfonic acids, α-sulfonated fatty acids, alkyl- or alkenybethercarboxylic acids and fatty acids. Among these acid precursors, preferred are those compounds having a high water resistance. Specific examples of the preferred acid precursors include fatty acids, hydroxy fatty acids and alkylphosphoric acids. In particular, from the viewpoint of a good dissolvability, among these acid precursors, more preferred are one or more compounds selected from the group consisting of fatty acids and hydroxy-fatty acids having 10 to 22 carbon atoms. From the viewpoint of a good strength of the surface-modified particles, still more preferred are one or more compounds selected from the group consisting of saturated fatty acids having 12 to 20 carbon atoms.

The amount of the binder component added is preferably from 0.1 to 8 parts by mass, more preferably from 0.5 to 6 parts by mass and still more preferably from 1 to 4 parts by mass on the basis of 100 parts by mass of the particles (a).

The particles (a), the clay mineral particles (b), the metal oxide particles (c) and the binder component (d) may be respectively used singly or in combination of any two or more thereof.

(Method for Production of Alkali Agent-Containing Particles)

The alkali agent-containing particles of the present invention may be produced by contacting the clay mineral particles (b) with the particles (a). The clay mineral particles (b) may be contacted with the particles (a) by the methods using known stirring mixers. Examples of the suitable stirring mixers include "Henschel Mixer" available from Mitsui Mining Co., Ltd., "High-Speed Mixer" available from Fukae Industry Co., Ltd., "Vertical Granulator" available from Powrex Corp., "Loedige Mixer" available from Matsuzaka Giken. Co., Ltd., "Ploughshare Mixer" available from Pacific Machinery & Engineering Co., Ltd., and "Nauter Mixer" available from Hosokawa Micron Corp. Among these mixers, preferred are those mixers capable of inhibiting application of an excessively strong shear force to the particles (a) (hardly causing disintegration of the particles (a)) and having a good mixing efficiency. From such viewpoints, more preferred are those mixers of the type having a horizontal cylindrical mixing vessel and an agitation axis mounted along a center of the cylindrical vessel in which particles are mixed by agitation blades fitted to the agitation axis (horizontal mixers) such as Loedige Mixer and Ploughshare Mixer. Examples of continuous-type mixers other than those described above include "Flexo-Mix" available from Pauleta Co., Ltd., and "Turbulizer" available from Hosokawa Micron Corp, In the methods for producing the particles (a), the particles (a) produced by the methods A1 and A2 are deteriorated in adhesiveness. Therefore, from the viewpoint of allowing the clay mineral particles (b) to uniformly adhere to the surface of the respective particles (a), the binder component (d) is preferably used in combination with these particles. On the other hand, in the method A3, since the obtained particles are impregnated with the surfactant (a3) serving as an adhesive, it is not particularly required to use the binder component (d).

The temperature of the reaction system upon stirring and mixing the particles (a) and the clay mineral particles (b) with each other is preferably not lower than a melting point of the binder component (d) (Tg when the binder is a polymer compound) but not higher than the temperature causing no quality problem, more specifically, preferably 100° C. or lower and more preferably 90° C. or lower.

In the present invention, following the contact between the particles (a) and the clay mineral particles (b), the metal oxide particles (c) are preferably contacted therewith. Upon the contact with the metal oxide particles (c), there may be used the same stirring mixers as described above.

In the above contacting procedure, the layer of the metal oxide particles (c) is successively formed on an outer surface of the layer of the clay mineral particles (b). In this case, it is not necessarily required to coat a whole surface of the respective particles (a) with the layer of the clay mineral particles (b), and coat a whole surface of the layer of the particles (b) with the layer of the metal oxide particles (c). More specifically, the layer of the metal oxide particles (c) may be present on a part of the surface of the respective particles (a), or the particles (a) may be partially exposed outside.

It is preferred that 30 to 100%, preferably 40 to 100% and more preferably 50 to 100% of the surface of the respective particles (a) is covered with the layer of the clay mineral particles (b), and a remaining uncovered surface of the respective particles (a) is coated with the layer of the metal oxide particles (c). It is more preferred that the whole surface of the respective particles (a) is successively covered with the layer of the clay mineral particles (b) and the layer of the metal oxide particles (c).

[Detergent Composition]

The alkali agent-containing particles of the present invention are suitably used as detergent particles for detergent compositions. The method for producing the detergent composition is not particularly limited. For example, the detergent composition may be produced by mixing the alkali agent-containing particles of the present invention with separately prepared detergent components. The obtained detergent composition may be used in various applications employing a powder detergent without any particular limitation. For example, the detergent composition may be suitably used as powder detergents for clothes, detergents for automatic dish washers, etc.

Examples of the separately prepared detergent components include surfactants, known detergent base materials such as builder granules, bleaching agents (such as percarbonates and perborates), bleaching activator, resoiling inhibitors (such as carboxymethyl cellulose), softening agents, reducing agents (such as sulfites), fluorescent brighteners, defoaming agents (such as silicones), enzymes such as cellulase and protease, dyes and perfumes.

The content of the alkali agent-containing particles in the detergent composition is preferably 50% by mass or more, more preferably 60% by mass or more, still more preferably 70% by mass or more and further still more preferably 80% by mass or more from the viewpoint of a good detergency. Also, the content of the separately prepared detergent components in the detergent composition is preferably 50% by mass or less, more preferably 40% by mass or less, still more preferably 30% by mass or less and further still more preferably 20% by mass or less.

EXAMPLES

In the following Production Examples, Examples and Comparative Examples, the "part(s)" and "%" represent "part(s) by mass" and "% by mass", respectively, unless otherwise specified. Also, the swelling power, water impregnation capacity, bulk density, average particle size, carrying capacity, particle strength, flowability, dissolution rate, mass increase rate, sieve passing rate and oozing property of the particles obtained in Examples and Comparative Examples were measured and evaluated by the following methods.

In addition, the molar ratio of [(Na+K+Li)/(Ca+Mg)] and the amount of calcium contained between layers of clay mineral were measured by the methods described in the preceding paragraph [0024].

(1) Swelling Power (mL/2 g)

The swelling power (according to a volumetric method) was measured by the method prescribed in Japan Bentonite Manufactures Association "Swelling Test Method for Bentonite (Powder)" (JBAS-104-77).

(2) Water Impregnation Capacity (%)

A dispersion obtained after measuring the swelling power of the particles (according to a volumetric method) was subjected to suction filtration (under 0.5 MPa for 2 h; filter paper: "Type No. 4A" having a diameter of 90 mm available from Advantec Toyo Kaisha, Ltd.) using a Buchner funnel to measure a mass (A) of a residue of the clay mineral particles (b) on the filter paper. Also, the clay mineral particles (b) were dried according to a drying method of a sample prescribed in JIS K0068 "Method for Measuring Water Content of Chemical Products; 7: Loss-on-Drying Method" to measure a mass (B) of the dried clay mineral particles (b). The water impregnation capacity of the clay mineral particles (b) was calculated from the thus measured mass (A) and mass (B) according to the following formula:

$$\text{Water impregnation capacity (\%)} = [(A-B)/B] \times 100.$$

(3) Bulk Density (g/L)

Measured by the method prescribed in JIS K3362.

(4) Average Particle Size (μm)

One hundred grams of sample particles were vibrated for 5 min and passed through sieves prescribed in JIS Z 8801 to calculate an average particle size thereof.

More specifically, using 9-stage sieves having mesh sizes of 2000 μm, 1400 μm, 1000 μm, 710 μm, 500 μm, 355 μm, 250 μm, 180 μm and 125 μm, respectively, as well as a receptacle which were successively fitted to a Ro-tap (rotation tap) machine (available from Heiko Seisakusho, Ltd.; tapping: 156 times/min; rolling: 290 times/min), 100 g of the sample particles were vibrated for 5 min and passed through the sieves. Thereafter, a mass frequency of respective undersize particles was sequentially accumulated in the order of the receptacle, and the 125 μm-, 180 μm-, 250 μm-, 355 μm-, 500

µm-, 710 µm-, 1000 µm-, 1400 µm-, and 2000 µm-mesh sieves. The mesh size of the sieve where the cumulative mass frequency first reached 50% or more was represented by $x_j$ µm, and the mesh size of the sieve smaller by one stage than the above sieve was represented by $x_{j+1}$ µm. When the cumulative mass frequency from the receptacle to the sieve with a mesh size of $x_j$ µm was represented by $Q_j$% and the cumulative mass frequency from the receptacle to the sieve with a mesh size of $x_{j+1}$ µm was represented by $Q_{j+1}$%, the average particle size $x_n$ of the particles was calculated according to the following formulae (1) and (2).

$$x_a = 10^z \quad (1)$$

$$Z = \log x_{j+1} + (\log x_j - \log x_{j+1}) \times \frac{50 Q_{j+1}}{Q_j - Q_{j+1}} \quad (2)$$

(5) Carrying Capacity of Particles (a)

A cylindrical mixing vessel having an inner diameter of 5 cm and a height of 15 cm which was equipped inside thereof with agitation blades was charged with 100 g of sample particles. While operating the agitation blades at a rotational speed of 350 rpm, a polyoxyethylene alkyl ether ("EMULGEN 106" available from Kao Corp.) maintained at 25° C. was charged into the vessel at a feed rate of 10 mL/min. The amount of the polyoxyethylene alkyl ether charged at which the power required for operating the agitation blades became highest was determined as a carrying capacity of the particles.

(6) Strength of Particles (kg/cm²)

A cylindrical container having an inner diameter of 3 cm and a height of 8 cm was charged with 20 g of sample particles. Then, the particles were subjected to tapping 30 times (using a TVP1-type tapping tight-packing bulk density measuring device available from Tsutsui Scientific Instruments Co., Ltd.; conditions; cycle: 36 times/min; free-fall dropping from a height of 60 mm). Immediately after completing the tapping operation, a height of the sample particles in the container was measured as an initial height thereof. Thereafter, an entire upper end surface of the sample particles retained in the container was pressed at a rate of 10 mm/min using a press tester to measure a load-displacement curve. The value obtained by multiplying a gradient of a linear portion of the curve where the displacement rate was 5% or less by the initial height of the particles was divided by the pressed area, and the thus calculated value was determined as the strength of the particles.

(7) Flowability

The flowability was evaluated by a time (sec) required for flowing 100 mL of the particles out of a hopper for measuring a bulk density as prescribed in JIS K 3362.

(8) Dissolution Rate (%)

A mass [a] of a meshed netting (110 mmφ: 200 mesh) was measured by a precision balance. The particles in an amount of 1.000 g±0.010 g (mass [b] of sample particles) were charged into 1.00 L±0.03 L of water having a hardness of 4° DH at a temperature of 5° C.±0.5° C., and the resulting suspension was stirred for 60 s using a cylindrical stirrer (length: 35 mm; diameter: 8 mm) in a 1 L beaker (inner diameter: 105 mm) at a rotational speed of 800 rpm, and then subjected to filtration through the meshed netting fixed to a holder by a tilting method. The beaker, stirrer piece and holder used above were rinsed with water at 5° C. to recover the residue on the meshed netting. The meshed netting used above was placed on a filter paper, and surplus water and bubbles were removed from the residue thereon while preventing loss of the residue. The thus obtained residue was dried at 105° C. for 30 min and then cooled for 10 min in a desiccator to measure a mass [c] thereof using a precision balance. The dissolution rate V (%) was calculated according to the following formula (3).

$$V(\%) = \{1-(c-a)/b\} \times 100 \quad (3)$$

(9) Mass Increase Rate (%) (Storage Stability)

A sample in an amount of 30 mg was set to a water vapor adsorption and desorption measuring device "DVS-Advantage" available from Surface Measurement System Corp., and a mass (p) of the sample after allowing the sample to stand in an atmosphere of 30° C. and 40% RH for 3 h as well as a mass (q) thereof when reaching an equilibrium condition upon changing the atmosphere to 30° C. and 70% RH were respectively measured. The mass increase rate w (%) was calculated according to the following formula.

$$w(\%) = 100 \times (q-p)/p$$

Meanwhile, the condition in which the mass increase rate reached 0.002% or less for about 1 min was determined as the equilibrium condition.

(10) Sieve-Passing Rate (%) and Oozing Property

A filter paper "Type No. 2" available from Advantec Toyo Kaisha, Ltd., was formed into a top-opened box having a length of 10.2 cm, a width of 6.2 cm and a height of 4 cm, and fixedly joined at four corners thereof by a stapler. Fifty grams of the particles were charged into the thus formed box, and allowed to stand at a temperature of 30° C. and a humidity of 70% RH for 21 days and for 28 days to measure a caking condition of the particles by the following method.

Sieve-passing rate: The sample obtained after the above standing test was gently transferred on a sieve (having a mesh size of 4760 µm prescribed in JIS Z 8801) and passed therethrough to measure a mass of the undersize particles and calculate a sieve-passing ratio (%) of the particles obtained after the standing test.

Oozing property: The bottom, surface (surface non-contacted with the particles) of the filter paper container after subjected to the above sieve passing test was observed by naked eyes to evaluate the oozing condition according to the following Ranks 1 to 5.

(Evaluation Criteria)

Rank 1: Not wetted
Rank 2: About ¼ of the bottom surface was wetted
Rank 3: About ½ of the bottom surface was wetted
Rank 4: About ¾ of the bottom surface was wetted
Rank 5: The whole bottom surface was wetted Meanwhile, details of the raw materials used in Examples and Comparative Examples are as follows, Sodium sulfate: tradename "Anhydrous Neutral Mirabilite" available from Shikoku Chemicals Corp.

Sodium sulfite: tradename "Sodium Sulfite" available from Mitsui Chemicals Inc.

Sodium carbonate: tradename "Dense Ash" available from Central Glass Co., Ltd.; average particle size: 290 µm Sodium polyacrylate aqueous solution; available from Kao Corp.; mass-average molecular weight: 10000

Crystalline aluminosilicate: "4A-type Zeolite" available from Zeo-Builder Inc.; average particle size: 3.5 µm Polyethylene glycol: tradename "PEG13000" available from Mitsui Chemicals Inc.; mass-average molecular weight: 10000; solid content: 60%

Anionic surfactant (p): sodium dodecylbenzenesulfonate; tradename "NEOPELEX G-25" available from Kao Corp.; solid content: 26% by mass Nonionic surfactant (q): polyoxyethylene lauryl ether; tradename "EMULGEN 106 (E-106)" available from Kao Corp.

Layered clay mineral 1: synthetic hectorite; hydrophilicity (reagent: available from Wako Pure Chemical Industries, Ltd.); average particle size: 49.3 μm; swelling power: 45 mL/2 g; water impregnation capacity: 2176%

Layered clay mineral 2: tradename "ODOEARTH P-700" available from Kurosaki Hakudo Kogyo Co., Ltd.; average particle size: 6.7 μm; [(Na+K+Li)/(Ca+Mg)]=0.161; swelling power: 9 mL/2 g; water impregnation capacity: 261%; main component: bentonite Layered clay mineral 3: kaolin (reagent; available from Kanto Chemical Co., Inc.); average particle size: 5.2 μm Layered clay mineral 4: talc; tradename "T Talc" available from Takehara Kagaku Kogyo Co., Ltd.; average particle size: 10.5 μm (Activation of Layered Clay mineral 2)

Layered Clay mineral 2A

A mixing vessel equipped with agitation blades was charged with 300 parts of water, and the temperature of water was adjusted to 25° C. Then, 1 part of sodium carbonate was added to the mixing vessel, and the contents of the mixing vessel were stirred for 5 min. After adding 5 parts of the layered clay mineral 1 to the mixing vessel, the contents of the mixing vessel were stirred for 60 min, and then dried in a rotary kiln at 140° C. until the water content reached 5% or less. The obtained dried product was pulverized by a ball mill to obtain a layered clay mineral 2A. As a result, it was confirmed that the layered clay mineral 2A had an average particle size of 38.3 μm, a molar ratio [(Na+K+Li)/(Ca+Mg)] of 13.350, a swelling power of 22 mL/2 g, and a water impregnation capacity of 623%, Layered Clay mineral 2B The same procedure as used for producing the layered clay mineral 2A was repeated except for changing the amount of sodium carbonate to 0.690 part, thereby obtaining a layered clay mineral 2B. As a result, it was confirmed that the layered clay mineral 2B had an average particle size of 36.5 μm, a molar ratio [(Na+K+Li)/(Ca+Mg)] of 9.414, a swelling power of 20 mL/2 g, and a water impregnation capacity of 643%.

Layered Clay mineral 2C

The same procedure as used for producing the layered clay mineral 2A was repeated except for changing the amount of sodium carbonate to 0.525 part, thereby obtaining a layered clay mineral 2C. As a result, it was confirmed that the layered clay mineral 2C had an average particle size of 31.0 μm, a molar ratio [(Na+K+Li)/(Ca+Mg)] of 4.838, a swelling power of 25 mL/2 g, and a water impregnation capacity of 770%.

Layered Clay mineral 2D

The same procedure as used for producing the layered clay mineral 2A was repeated except for changing the amount of sodium carbonate to 0.375 part, thereby obtaining a layered clay mineral 2D. As a result, it was confirmed that the layered clay mineral 2D had an average particle size of 28.2 μm, a molar ratio [(Na+K+Li)/(Ca+Mg)] of 2.536, a swelling power of 28 mL/2 g, and a water impregnation capacity of 930%.

Layered Clay mineral 2E

The same procedure as used for producing the layered clay mineral 2A was repeated except for changing the amount of sodium carbonate to 0.345 part, thereby obtaining a layered clay mineral 2E. As a result, it was confirmed that the layered clay mineral 2E had an average particle size of 27.9 μm, a molar ratio [(Na+K+Li)/(Ca+Mg)] of 1.681, a swelling power of 25 mL/2 g, and a water impregnation capacity of 537%.

Layered Clay mineral 2F

The same procedure as used for producing the layered clay mineral 2A was repeated except for changing the amount of sodium carbonate to 0.150 part, thereby obtaining a layered clay mineral 2F. As a result, it was confirmed that the layered clay mineral 2F had an average particle size of 26.0 μm, a molar ratio [(Na+K+Li)/(Ca+Mg)] of 0.764, a swelling power of 16 mL/2 g, and a water impregnation capacity of 529%.

FIG. 1 shows the relationship between the "mass ratio of sodium carbonate/bentonite" used for activating the layered clay mineral 2 and the "amount of calcium contained between layers" of the layered clay mineral which is eluted out with ammonium chloride. The smaller value of the amount of calcium contained between layers (ordinate axis of graph) indicates the more activated condition of the layered clay mineral 2. It is recognized that even when sodium carbonate is added to the layered clay mineral (bentonite) in such an amount that the mass ratio of sodium carbonate/bentonite is 0.05 or more, the activation degree is already saturated and, therefore, no further effects by the addition are attainable. Although the minimum necessary amount of sodium carbonate varies depending upon the amount of calcium contained in the layered clay mineral (bentonite) to be activated, an optimum amount of sodium carbonate required can be found by making studies while varying the concentration of sodium carbonate added.

Figure 2:
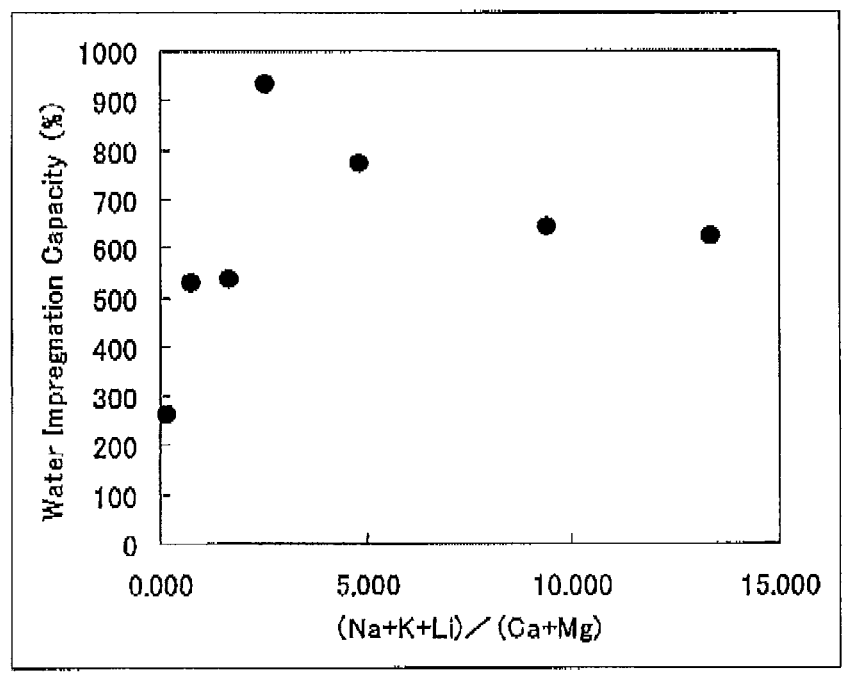
FIG. 2 is a graphic view showing a relationship between a molar ratio of [(Na+K+Li)/(Ca+Mg)] being present between layers of a layered clay mineral (bentonite) and a water impregnation capacity of the layered clay mineral.

FIG. 2 shows the relationship between the molar ratio [(Na+K+Li)/(Ca+Mg)] being present between the layers of the layered clay mineral (bentonite) and the water impregnation capacity thereof. From the results shown in FIG. 2, it is confirmed that although the water impregnation capacity of the clay mineral is enhanced by activation thereof, the excessively activated layered clay mineral (bentonite) suffers from increase in content of residual salts therein, thereby causing such a tendency that the water impregnation capacity is rather decreased. Therefore, since the activation degree required for maximizing the water impregnation capacity varies depending upon the kind of layered clay mineral (bentonite) used, it is preferred that the activation degree be appropriately adjusted according to the kind of layered clay mineral (bentonite) used.

Production Example 1

Production of Spray-Dried Particles

A 1 m³ mixing vessel equipped with agitation blades was charged with 410 parts of water, and after adjusting a temperature of water to 45° C., 110 parts of sodium sulfate, 8 parts of sodium sulfite and 2 parts of a fluorescent dye were added to the mixing vessel, and the contents of the mixing vessel were stirred for 10 min. Next, 120 parts of sodium carbonate and 150 parts of a 40% by mass sodium polyacrylate aqueous solution were added to the mixing vessel, and the contents of the mixing vessel were stirred for 10 min. Further, 40 parts of sodium chloride and 160 parts of a crystalline aluminosilicate were added to the mixing vessel, and the contents of the mixing vessel were stirred for 15 min, thereby obtaining a uniform slurry having a water content of 50% by mass. The final temperature of the thus obtained slurry was 50° C.

While feeding a nitrogen gas at 285° C. to a spray-drying tower from a lower portion thereof, the slurry was fed to the spray-drying tower (of a countercurrent flow type) by means of a pump and sprayed thereinto through a pressure spraying nozzle fitted near a top of the tower under a spraying pressure of 2.5 MPa. The nitrogen gas at 98° C. was discharged from the top of the tower. As a result, it was confirmed that the resulting spray-dried particles had a water impregnation capacity of 0%, an average particle size of 290 μm, a bulk density of 510 g/L, a carrying capacity of 65 mL/100 g and a particle strength of 350 kg/cm².

Production Example 2-1

Production of Surfactant Composition (a)

A nonionic surfactant and polyethylene glycol in amounts of 840 parts and 69 parts, respectively, were heated to 80° C. and then mixed with 960 parts of an anionic surfactant and 258 parts of a 48% sodium hydroxide aqueous solution, and the resulting mixture was stirred to produce a surfactant composition (a).

Production Example 2-2

Production of Surfactant Composition (b)

A nonionic surfactant and polyethylene glycol in amounts of 920 parts and 69 parts, respectively, were heated to 80° C. and then mixed with 883 parts of an anionic surfactant and 237 parts of a 48% sodium hydroxide aqueous solution, and the resulting mixture was stirred to produce a surfactant composition (b).

Production Example 2-3

Production of Surfactant Composition (c)

A nonionic surfactant and polyethylene glycol in amounts of 1022 parts and 69 parts, respectively, were heated to 80° C. and then mixed with 785 parts of an anionic surfactant and 211 parts of a 48% sodium hydroxide aqueous solution, and the resulting mixture was stirred to produce a surfactant composition (c).

Production Example 2-4

Production of Surfactant Composition (d)

A nonionic surfactant and polyethylene glycol in amounts of 1150 parts and 69 parts, respectively, were heated to 80° C. and then mixed with 662 parts of an anionic surfactant and 178 parts of a 48% sodium hydroxide aqueous solution, and the resulting mixture was stirred to produce a surfactant composition (d).

Production Example 2-5

Production of Surfactant Composition (e)

A nonionic surfactant and polyethylene glycol in amounts of 1314 parts and 69 parts, respectively, were heated to 80° C. and then mixed with 505 parts of an anionic surfactant and 136 parts of a 48% sodium hydroxide aqueous solution, and the resulting mixture was stirred to produce a surfactant composition (e).

Production Example 2-6

Production of Surfactant Composition (f)

A nonionic surfactant and polyethylene glycol in amounts of 1533 parts and 69 parts, respectively, were heated to 80° C. and then mixed with 294 parts of an anionic surfactant and 79 parts of a 48% sodium hydroxide aqueous solution, and the resulting mixture was stirred to produce a surfactant composition (f).

Example 1

Production of Detergent Particles 1

A Loedige mixer (available from Matsuzaka Giken Co., Ltd.; capacity: 130 L; equipped with a jacket) was charged with 45 parts of the spray-dried particles and 10 parts of sodium carbonate, and stirring of the contents in the mixer was initiated by operating a main axis of the mixer (rotating speed of agitation blades: 60 rpm; peripheral speed: 1.6 m/s). A warm water at 80° C. was flowed through the jacket at a rate of 10 L/min. Then, 25 parts of the surfactant composition (a) heated to 80° C. were charged into the mixer over 2 min, and then the contents in the mixer were stirred for 5 min, to carry the surfactant composition on the particles. Further, 5 parts of the layered clay mineral 1 were charged into the mixer, and then the contents in the mixer were stirred for 5 min. Next, 5 parts of the crystalline aluminosilicate were charged into the mixer, and then the contents in the mixer were stirred for 30 s by operating the main axis (rotating speed: 120 rpm; peripheral speed: 3.1 m/s) and a chopper (rotating speed: 3600 rpm; peripheral speed: 28 m/s). The operation of the main axis of the Loedige mixer was returned to the former conditions (rotating speed of agitation blades: 60 rpm; peripheral speed: 1.6 m/s), and additional 10 parts of the crystalline aluminosilicate were charged into the mixer. Further, the operation of the mixer were controlled again to the latter conditions [main axis (rotating speed: 120 rpm; peripheral speed: 3.1 m/s); chopper (rotating speed: 3600 rpm; peripheral speed: 28 m/s)], and the contents in the mixer were stirred for 30 min and then discharged therefrom, thereby obtaining detergent particles 1. The evaluation results of the thus obtained detergent particles 1 are shown in Table 1.

Example 2

Production of Detergent Particles 2

The same procedure as in Example 1 was repeated except for using the layered clay mineral 2 in place of the layered clay mineral 1 of the detergent particles 1, thereby obtaining detergent particles 2. The evaluation results of the thus obtained detergent particles 2 are shown in Table 1.

Examples 3 to 8

Production of Detergent Particles 2A to 2F

The same procedure as in Example 1 was repeated except for using the respective layered clay minerals 2A to 2F in place of the layered clay mineral 1 of the detergent particles 1, thereby obtaining detergent particles 2A to 2F. The evaluation results of the thus obtained detergent particles 2A to 2F are shown in Table 1.

Comparative Examples 1 to 3

Production of Detergent Particles 3 to 5

The same procedure as in Example 1 was repeated except for using the layered clay minerals 3 to 5 in place of the layered clay mineral 1 of the detergent particles 1, thereby obtaining detergent particles 3 to 5. The evaluation results of the thus obtained detergent particles 3 to 5 are shown in Table 1.

TABLE 1

| | Examples | | | |
|---|---|---|---|---|
| | 1 | 2 | 3 | 4 |
| Kind of detergent particles | Particles 1 | Particles 2 | Particles 2A | Particles 2B |
| Ratio between surfactants [(p)/(q)]*1 | 1.2 | 1.2 | 1.2 | 1.2 |
| Kind of clay mineral | Hectorite | Bentonite | Bentonite | Bentonite |
| Clay mineral | | | | |
| Sodium carbonate/bentonite | — | — | 0.067 | 0.046 |
| Amount of Ca eluted (ppm) | — | 1080 | 136 | 184 |
| Amount of Ca between layers (ppm) | — | 1.080 | 0.136 | 0.184 |
| (Na + K + Li)/(Ca + Mg) | — | 0.161 | 13.350 | 9.414 |
| Swelling power (mL/2 g) | 45 | 9 | 22 | 20 |
| Water impregnation capacity (%) | 2176 | 261 | 623 | 643 |
| Initial | | | | |
| Bulk density (g/L) | 782 | 784 | 780 | 778 |
| Average particle size (μm) | 305 | 306 | 301 | 308 |
| Flowability (sec) | 6.2 | 6.2 | 6.1 | 6.1 |
| Dissolution rate (%) | 88 | 87 | 87 | 88 |
| After storage | | | | |
| Mass increase rate (%) | 25.5 | 30.2 | 25.7 | 27.0 |
| Sieve-passing rate (%) | 100 | 83 | 97 | 96 |
| Oozing property | 2 | 2 | 2 | 2 |

| | Examples | | | |
|---|---|---|---|---|
| | 5 | 6 | 7 | 8 |
| Kind of detergent particles | Particles 2C | Particles 2D | Particles 2E | Particles 2F |
| Ratio between surfactants [(p)/(q)]*1 | 1.2 | 1.2 | 1.2 | 1.2 |
| Kind of clay mineral | Bentonite | Bentonite | Bentonite | Bentonite |
| Clay mineral | | | | |
| Sodium carbonate/bentonite | 0.035 | 0.025 | 0.023 | 0.010 |
| Amount of Ca eluted (ppm) | 312 | 480 | 600 | 820 |
| Amount of Ca between layers (ppm) | 0.312 | 0.480 | 0.600 | 0.820 |
| (Na + K + Li)/(Ca + Mg) | 4.838 | 2.536 | 1.681 | 0.764 |
| Swelling power (mL/2 g) | 25 | 28 | 25 | 16 |
| Water impregnation capacity (%) | 770 | 930 | 537 | 529 |
| Initial | | | | |
| Bulk density (g/L) | 786 | 782 | 780 | 775 |
| Average particle size (μm) | 310 | 300 | 305 | 301 |
| Flowability (sec) | 6.2 | 6.1 | 6.2 | 6.1 |
| Dissolution rate (%) | 86 | 87 | 88 | 86 |

TABLE 1-continued

| After storage | | | | |
|---|---|---|---|---|
| Mass increase rate (%) | 25.7 | 25.7 | 27.5 | 28.7 |
| Sieve-passing rate (%) | 99 | 100 | 92 | 90 |
| Oozing property | 2 | 2 | 2 | 2 |

| | Comparative Examples | | |
|---|---|---|---|
| | 1 | 2 | 3 |
| Kind of detergent particles | Particles 3 | Particles 4 | Particles 5 |
| Ratio between surfactants [(p)/(q)]*1 | 1.2 | 1.2 | 1.2 |
| Kind of clay mineral | Kaolin | Talc | Zeolite |
| Clay mineral | | | |
| Sodium carbonate/bentonite | — | — | — |
| Amount of Ca eluted (ppm) | — | — | — |
| Amount of Ca between layers (ppm) | — | — | — |
| (Na + K + Li)/(Ca + Mg) | — | — | — |
| Swelling power (mL/2 g) | 5 | 4 | 2 |
| Water impregnation capacity (%) | 68 | 86 | 67 |
| Initial | | | |
| Bulk density (g/L) | 791 | 792 | 798 |
| Average particle size (μm) | 308 | 308 | 310 |
| Flowability (sec) | 6.2 | 6.2 | 6.2 |
| Dissolution rate (%) | 85 | 84 | 86 |
| After storage | | | |
| Mass increase rate (%) | 30.5 | 30.4 | 32.5 |
| Sieve-passing rate (%) | 62 | 60 | 65 |
| Oozing property | 4 | 4 | 4 |

Note
*1Weight ratio of anionic surfactant (p) to nonionic surfactant (q) [(p)/(q)]

Examples 9 to 13

The same procedure as in Example 1 was repeated except for using the layered clay mineral 2A in place of the layered clay mineral 1 of the detergent particles 1 and using the respective surfactant compositions (b) to (f) in place of the surfactant composition (a), thereby obtaining detergent particles 2Ab to 2Af. The evaluation results of the thus obtained detergent particles 2Ab to 2Af as well as the evaluation results of the detergent particles 2A are shown in Table 2.

TABLE 2

| | Examples | | |
|---|---|---|---|
| | 3 | 9 | 10 |
| Kind of detergent particles | Particles 2A | Particles 2Ab | Particles 2Ac |
| Ratio between surfactants [(p)/(q)]*1 | 1.2 | 1.0 | 0.8 |
| Kind of clay mineral | Bentonite | Bentonite | Bentonite |
| Clay mineral | | | |
| Sodium carbonate/bentonite | 0.067 | 0.067 | 0.067 |
| Amount of Ca eluted (ppm) | 136 | 136 | 136 |
| Amount of Ca between layers (ppm) | 0.136 | 0.136 | 0.136 |
| (Na + K + Li)/(Ca + Mg) | 13.350 | 13.350 | 13.350 |
| Swelling power (mL/2 g) | 22 | 22 | 22 |
| Water impregnation capacity (%) | 623 | 623 | 623 |
| Initial | | | |
| Bulk density (g/L) | 780 | 773 | 765 |
| Average particle size (μm) | 301 | 298 | 295 |
| Flowability (sec) | 6.1 | 6.1 | 6.3 |
| Dissolution rate (%) | 87 | 85 | 85 |

TABLE 2-continued

After storage

| | | | |
|---|---|---|---|
| Mass increase rate (%) | 25.7 | 25.9 | 26.5 |
| Sieve-passing rate (%) | 97 | 95 | 77 |
| Oozing property | 2 | 2 | 3 |

| | Examples | | |
|---|---|---|---|
| | 11 | 12 | 13 |
| Kind of detergent particles | Particles 2Ad | Particles 2Ae | Particles 2Af |
| Ratio between surfactants [(p)/(q)]*¹ | 0.6 | 0.4 | 0.2 |
| Kind of clay mineral | Bentonite | Bentonite | Bentonite |
| Clay mineral | | | |
| Sodium carbonate/bentonite | 0.067 | 0.067 | 0.067 |
| Amount of Ca eluted (ppm) | 136 | 136 | 136 |
| Amount of Ca between layers (ppm) | 0.136 | 0.136 | 0.136 |
| (Na + K + Li)/(Ca + Mg) | 13.350 | 13.350 | 13.350 |
| Swelling power (mL/2 g) | 22 | 22 | 22 |
| Water impregnation capacity (%) | 623 | 623 | 623 |
| Initial | | | |
| Bulk density (g/L) | 766 | 770 | 775 |
| Average particle size (μm) | 297 | 305 | 302 |
| Flowability (sec) | 6.3 | 6.5 | 6.5 |
| Dissolution rate (%) | 84 | 85 | 86 |
| After storage | | | |
| Mass increase rate (%) | 26.9 | 29.9 | 30.8 |
| Sieve-passing rate (%) | 75 | 58 | 51 |
| Oozing property | 3 | 5 | 5 |

Note
*¹Weight ratio of anionic surfactant (p) to nonionic surfactant (q) [(p)/(q)]

Figure 3:
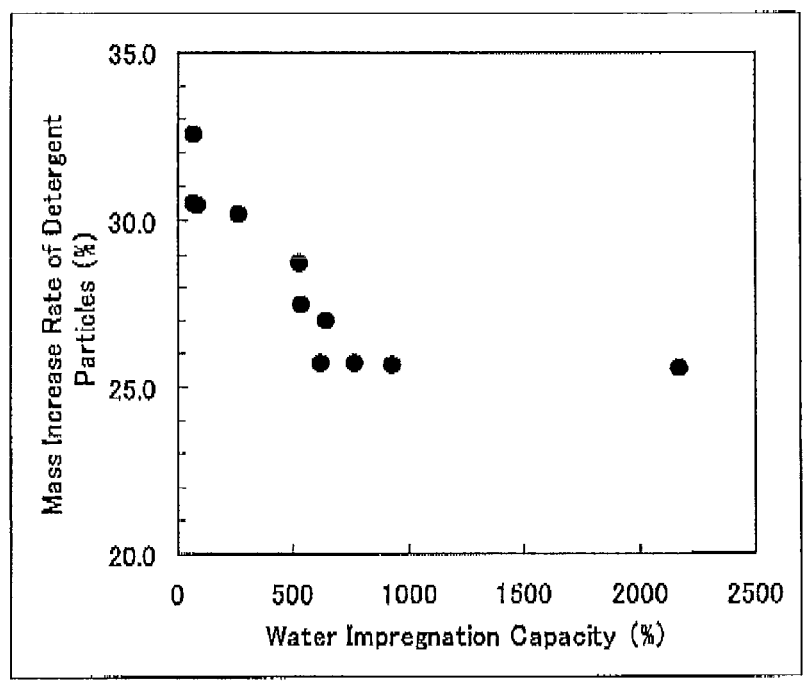
FIG. 3 is a graphic view showing a relationship between a water impregnation capacity of the layered clay mineral and a mass increase rate of detergent particles.
Figure 4:
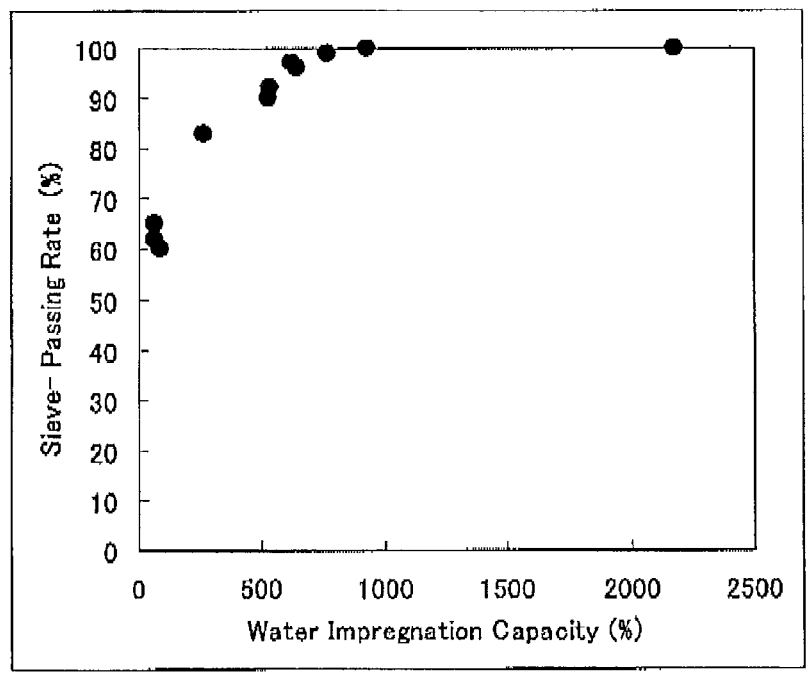
FIG. 4 is a graphic view showing a relationship between a water impregnation capacity and a sieve-passing rate of detergent particles.

FIG. 3 shows the relationship between the water impregnation capacity of the layered clay mineral and the mass increase rate of the detergent particles, and FIG. 4 shows the relationship between the water impregnation capacity and the sieve-passing rate of the layered clay mineral.

As apparently recognized from FIG. 3, as the water impregnation capacity of the layered clay mineral increases, the mass increase rate of the resulting detergent particles becomes lowered. Therefore, it is confirmed that the obtained detergent particles hardly suffer from dissolution with an alkali and recrystallization which tend to cause caking of the detergent particles.

Figure 5:
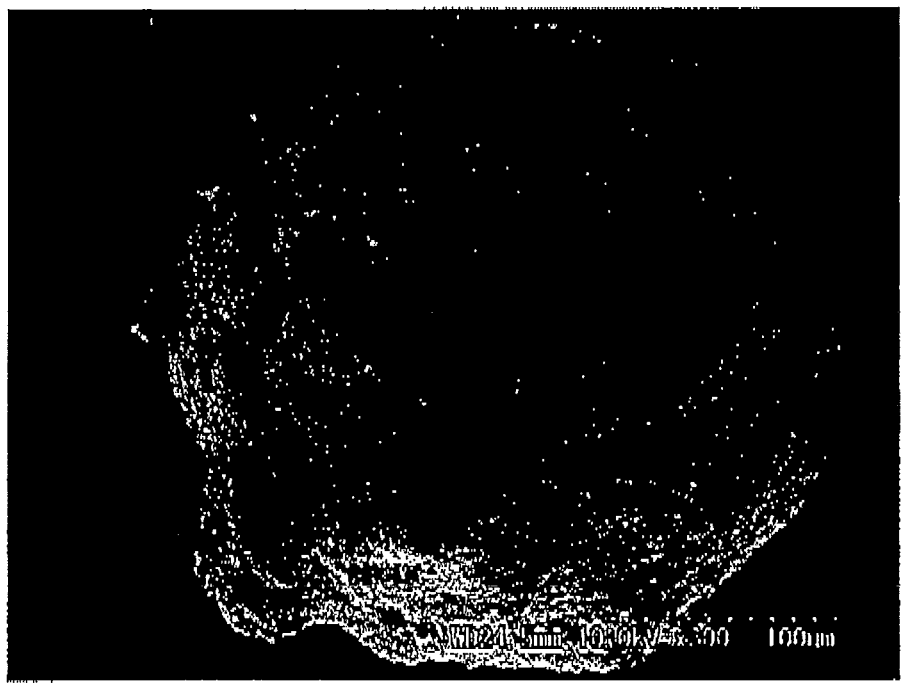
FIG. 5 is a view showing a surface condition of detergent particles 2D (having a water impregnation capacity of 930%).
Figure 6:
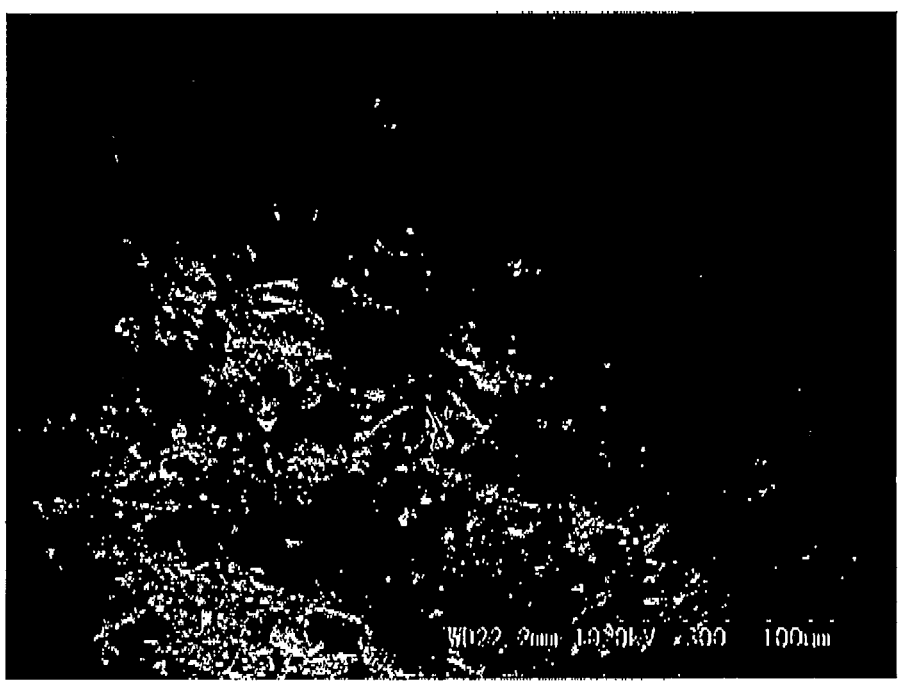
FIG. 6 is a view showing a surface condition of detergent particles 4 (having a water impregnation capacity of 86%).

For the comparison between surface conditions of the detergent particles after measurement of the mass increase rate thereof, the surface condition of the detergent particles 2D (water impregnation capacity: 930%) is shown in FIG. 5, and the surface condition of the detergent particles 4 (water impregnation capacity: 86%) is shown in FIG. 6. When comparing FIGS. 5 and 6 with each other, it is recognized that the detergent particles having a higher water impregnation capacity (detergent particles 2D) are free from deposition of acicular crystals on the surface thereof. Also, as shown in FIG. 4, it is recognized that as the water impregnation capacity becomes higher, the detergent particles are enhanced in sieve-passing rate.

In addition, it is also recognized that the detergent particles of Examples 1 to 8 having a high water impregnation capacity are excellent in anti-oozing property as compared to those of Comparative Examples 1 to 8 having a low water impregnation capacity.

Further, it is also recognized that the detergent particles of Examples 1 to 8 are substantially identical in bulk density, average particle size, flowability and dissolution rate to those of the detergent particles of Comparative Examples 1 to 3 and, therefore, exhibit sufficient properties required for high-bulk density detergent particles.

Also, from the results of Examples 2 and 9 to 13, it is confirmed that when the same bentonite is used, the detergent particles having a higher content of the anionic surfactant are more excellent in storage stability.

INDUSTRIAL APPLICABILITY

The alkali agent-containing particles of the present invention are free from deterioration of dissolvability in water and exhibit an excellent anti-caking property and, therefore, can be suitably used as detergent particles for detergent compositions.

The invention claimed is:

1. Alkali agent-containing particles comprising:
   (a) particles containing an alkali agent and having an average particle size of from 150 to 1000 μm, and
   a layer of (b) clay mineral particles exhibiting a water impregnation capacity of 400% by mass or more as calculated according to the following method and having an average particle size of from 10 to 100 μm,
   wherein the layer of (b) clay mineral particles is formed on a surface of the respective particles (a);
Method for calculation of water impregnation capacity:
   a dispersion of the clay mineral particles (b) obtained after measuring a swelling power of the particles (b) according to a volumetric method of a Standard Testing Method of Japan Bentonite Manufactures Association "Swelling Test Method for Bentonite (Powder)" prescribed JBAS104-77 is subjected to suction filtration under 0.5 MPa for 2 h filter paper: "Type No. 4A" having a diameter of 90 mm available from Advantec Toyo Kaisha, Ltd. using a Buchner funnel to measure a mass (A) of a residue of the clay mineral particles (b) on the filter paper; the clay mineral particles (b) are dried according to a drying method of a sample prescribed in HS K0068 "Method for Measuring Water Content of Chemical Products; 7: Loss-on-Drying Method" to measure a mass (B) of the dried clay mineral particles (b); and a water impregnation capacity of the clay mineral particles (b) is calculated from the thus measured mass (A) and mass (B) according to the following formula:

water impregnation capacity (%)=[(A−B)/B]×100;

further comprising a layer of (c) metal oxide particles exhibiting a water impregnation capacity of 150% by mass or less and having an average particle size of from 0.1 to 20 μm which layer is formed on an outer surface of the layer of the clay mineral particles (b).

2. The alkali agent-containing particles according to claim 1, wherein the alkali agent is an alkali metal carbonate.

3. The alkali agent-containing particles according to claim 1, wherein the particles (a) are detergent particles.

4. The alkali agent-containing particles according to claim 1, wherein the clay mineral particles (b) are particles of a layered clay mineral.

5. The alkali agent-containing particles according to claim 1, wherein the clay mineral particles (b) are particles of a clay mineral having a structure represented by the general formula (II):

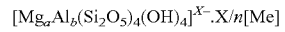

$$[Mg_aAl_b(Si_2O_5)_4(OH)_4]^{X-} \cdot X/n[Me] \quad (II)$$

wherein a, b and X are respectively 0<a≦6; 0≦b≦4; and 0.2≦X≦1.2 with the proviso that X=12−(2a+3b); Me is at least one element selected from the group consisting of Na, K, Li, Ca and Mg; n is a valence of Me; and a molar ratio of [(Na+K+Li)/(Ca+Mg)] in $[Me]^{n+}$ is 0.5 or more.

6. The alkali agent-containing particles according to claim 1, wherein the clay mineral particles (b) are particles of hectorite.

7. The alkali agent-containing particles according to claim 1, wherein the particles (a) are detergent particles containing (p) an anionic surfactant and (q) a nonionic surfactant in which a weight ratio of the anionic surfactant (p) to the nonionic surfactant (q)[(p)/(q)] is 0.5 or more.

8. The alkali agent-containing particles according to claim 1, wherein 50 to 100% of the surfaces of the particles (a) are covered with the layer of clay mineral particles (b).

9. The alkali agent-containing particles according to claim 1, wherein the clay mineral particles (b) exhibit a water impregnation capacity of 600% by mass or more.

10. The clay mineral particles according to claim 1, wherein the clay mineral particles (b) have an average particle size of from 10 to 50 μm.

11. A detergent composition comprising the alkali agent-containing particles as defined in claim 1.

12. A method for suppressing caking of alkali agent-containing particles, comprising the step of forming a layer of (b) clay mineral particles exhibiting a water impregnation capacity of 400% by mass or more as calculated according to the following method and having an average particle size of from 10 to 100 μm on a surface of each of (a) particles containing an alkali agent and having an average particle size of from 150 to 1000 μm;

Method for calculation of water impregnation capacity:
a dispersion of the clay mineral particles (b) obtained after measuring a swelling power of the particles (b) according to a volumetric method of a Standard Testing Method of Japan Bentonite Manufactures Association "Swelling Test Method for Bentonite (Powder)" prescribed in JBAS-104-77 is subjected to suction filtration under 0.5 MPa for 2 h with filter paper: "Type No. 4A" having a diameter of 90 mm available from Advantec Toyo Kaisha, Ltd. using a Buchner funnel to measure a mass (A) of a residue of the clay mineral particles (b) on the filter paper; the clay mineral particles (b) are dried according to a drying method of a sample prescribed in JIS K0068 "Method for Measuring Water Content of Chemical Products; 7: Loss-on-Drying Method" to measure a mass (B) of the dried clay mineral particles (b); and a water impregnation capacity of the clay mineral particles (b) is calculated from the thus measured mass (A) and mass (B) according to the following formula:

water impregnation capacity (%)=$[(A-B)/B]\times 100$;

further comprising forming a layer of (c) metal oxide particles, exhibiting a water impregnation capacity of 150% by mass or less and having an average particle size of from 0.1 to 20 μm, on an outer surface of the layer of the clay mineral particles (b).

* * * * *